US 9,804,400 B2

(12) United States Patent
Yoshida

(10) Patent No.: US 9,804,400 B2
(45) Date of Patent: Oct. 31, 2017

(54) DISPLAY APPARATUS

(71) Applicant: SONY CORPORATION, Tokyo (JP)

(72) Inventor: Takaaki Yoshida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/038,804

(22) PCT Filed: Oct. 17, 2014

(86) PCT No.: PCT/JP2014/005277
§ 371 (c)(1),
(2) Date: Nov. 16, 2016

(87) PCT Pub. No.: WO2015/083316
PCT Pub. Date: Jun. 11, 2015

(65) Prior Publication Data
US 2017/0097509 A1 Apr. 6, 2017

(30) Foreign Application Priority Data
Dec. 5, 2013 (JP) ................................ 2013-251774

(51) Int. Cl.
| F21V 7/04 | (2006.01) |
| G03H 1/00 | (2006.01) |
| G02B 27/01 | (2006.01) |
| F21V 8/00 | (2006.01) |
| H04N 9/31 | (2006.01) |

(52) U.S. Cl.
CPC ....... *G02B 27/0176* (2013.01); *G02B 6/0085* (2013.01); *G02B 27/0172* (2013.01); *H04N 9/3141* (2013.01); *G02B 2027/0178* (2013.01)

(58) Field of Classification Search
USPC ............................................ 359/13; 362/611
See application file for complete search history.

(56) References Cited

U.S. PATENT DOCUMENTS

2007/0177239 A1* 8/2007 Tanijiri ................ G02B 27/017
359/13

FOREIGN PATENT DOCUMENTS

| JP | 11-084310 A | 3/1999 |
| JP | 2008-099222 A | 4/2008 |

(Continued)

OTHER PUBLICATIONS

Extended European Search Report of EP Patent Application No. 14867472.4, dated Jul. 10, 2017, 7 pages.

*Primary Examiner* — Daniel Hess
(74) *Attorney, Agent, or Firm* — Chip Law Group

(57) ABSTRACT

[Object]
To provide a display apparatus capable of obtaining excellent heat radiation performance of a light source while ensuring positional accuracy of the light source.
[Solving Means]
A display apparatus according to an embodiment of the present technology includes a light guide portion, a casing, a projection portion, a heat source, and a heat-transfer member. The light guide portion is disposed in front of eyes of a user. The casing is fixed to the light guide portion. The projection portion is housed in the casing and is configured to be capable of projecting an image to the light guide portion. The heat-transfer member includes a first end and a second end, the first end being connected to the heat source, the second end being connected to an inner surface of the casing, and is configured to be deformable.

10 Claims, 10 Drawing Sheets

(56) References Cited

FOREIGN PATENT DOCUMENTS

JP  2012-182398 A   9/2012
WO  2013/136696 A1  9/2013

\* cited by examiner

DISPLAY APPARATUS

CROSS REFERENCE TO RELATED APPLICATIONS

This application is a U.S. National Phase of International Patent Application No. PCT/JP2014/005277 filed on Oct. 17, 2014, which claims priority benefit of Japanese Patent Application No. JP 2013-251774 filed in the Japan Patent Office on Dec. 5, 2013. Each of the above-referenced applications is hereby incorporated herein by reference in its entirety.

TECHNICAL FIELD

The present technology relates to a display apparatus that is mounted on the head of a user for use, for example.

BACKGROUND ART

There is known a head-mounted display (hereinafter, also referred to as HMD) that is configured to be mounted on the head of a user to present an image to the individual user by a display disposed in front of the eyes of the user. The HMD is required to efficiently radiate heat of an internal heat-generating spot. For example, Patent Document 1 below proposes that a material having high thermal conductivity is used for a cabinet of a display portion.

Patent Document 1: Japanese Patent Application Laid-open No. Hei 11-84310

SUMMARY OF INVENTION

Problem to be Solved by the Invention

If a heat-generating spot and a heat radiation portion are rigidly fixed, and in the case where the heat-generating spot is a light source that forms images, it is difficult to adjust a position of the light source. Further, if the light source is rigidly fixed to the heat radiation portion, it is impossible to provide a configuration in which external force is prevented from being applied to the light source located at an adjusted position. Along with downsizing and reduction in weight of an HMD in recent years, the problems as described above become more and more prominent.

In view of the circumstances as described above, it is an object of the present technology to provide a display apparatus that is capable of obtaining excellent heat radiation performance of a light source while ensuring positional accuracy of the light source.

Means for Solving the Problem

In order to achieve the object described above, according to an embodiment of the present technology, there is provided a display apparatus including a light guide portion, a casing, a projection portion, a heat source, and a heat-transfer member.

The light guide portion is disposed in front of eyes of a user.

The casing is fixed to the light guide portion.

The projection portion is housed in the casing and is configured to be capable of projecting an image to the light guide portion.

The heat-transfer member includes a first end and a second end, the first end being connected to the heat source, the second end being connected to an inner surface of the casing, and is configured to be deformable.

In the display apparatus, the heat of the heat source can be efficiently radiated by the heat-transfer member disposed between the heat source and the casing. Further, since the heat-transfer member is configured to be deformable, distortion by external force acting on the casing is absorbed by the heat-transfer member. This makes it possible to ensure positional accuracy of the light source, even in the case where the heat source is a light source.

The casing may include a first casing portion and a second casing portion. The first casing portion supports the heat source. The second casing portion is attached to the first casing portion and connected to the second end.

Since the heat-transfer member is configured to be deformable, it is possible to attach the second casing portion to the first casing portion in a state where the second end is connected to the inner surface of the second casing portion, and it is also possible to easily adjust the position of the light source as a heat source, for example.

The first casing portion may constitute an inner side surface of the casing facing the user, and the second casing portion may constitute an outer side surface of the casing.

This makes it possible to protect the light source from external force acting on the outer side surface of the casing, in the case where the heat source is a light source.

The heat-transfer member may be constituted by a sheet-like carbon-based material. This makes it possible to achieve reduction in weight and downsizing of the display apparatus.

The heat-transfer member may be housed in the casing in a folded state. This makes it possible to improve workability of assembly of the display apparatus.

The display apparatus may further include a detection portion. The detection portion is provided to the casing and is configured to be capable of detecting an input operation of the user.

This makes it possible to configure a display apparatus including an input operation portion.

The detection portion may include a pair of detection elements that are disposed to sandwich the second end. This makes it possible to detect an input operation of a user without impairing a heat radiation effect of the heat source.

The pair of detection elements may be constituted by proximity sensors.

Since an input operation of a user can be detected in a contactless manner with respect to the casing, this makes it possible to perform an input operation without applying external force to the casing.

In the case where the heat source is a light source, the projection portion may include a projection optical portion and an image modulation element disposed between the light source and the projection optical portion.

Alternatively, in the case where the heat source is an image display portion including a self-emitting element, the projection portion may include a projection optical portion that projects a display image of the image display portion to the light guide portion.

Effects of the Invention

As described above, according to the present technology, it is possible to enhance heat radiation performance of the heat source.

It should be noted that the effects described herein are not necessarily limited and any effect described in this disclosure may be produced.

MODE(S) FOR CARRYING OUT THE INVENTION

Hereinafter, embodiments of the present technology will be described with reference to the drawings.

<First Embodiment>

Figure 1:
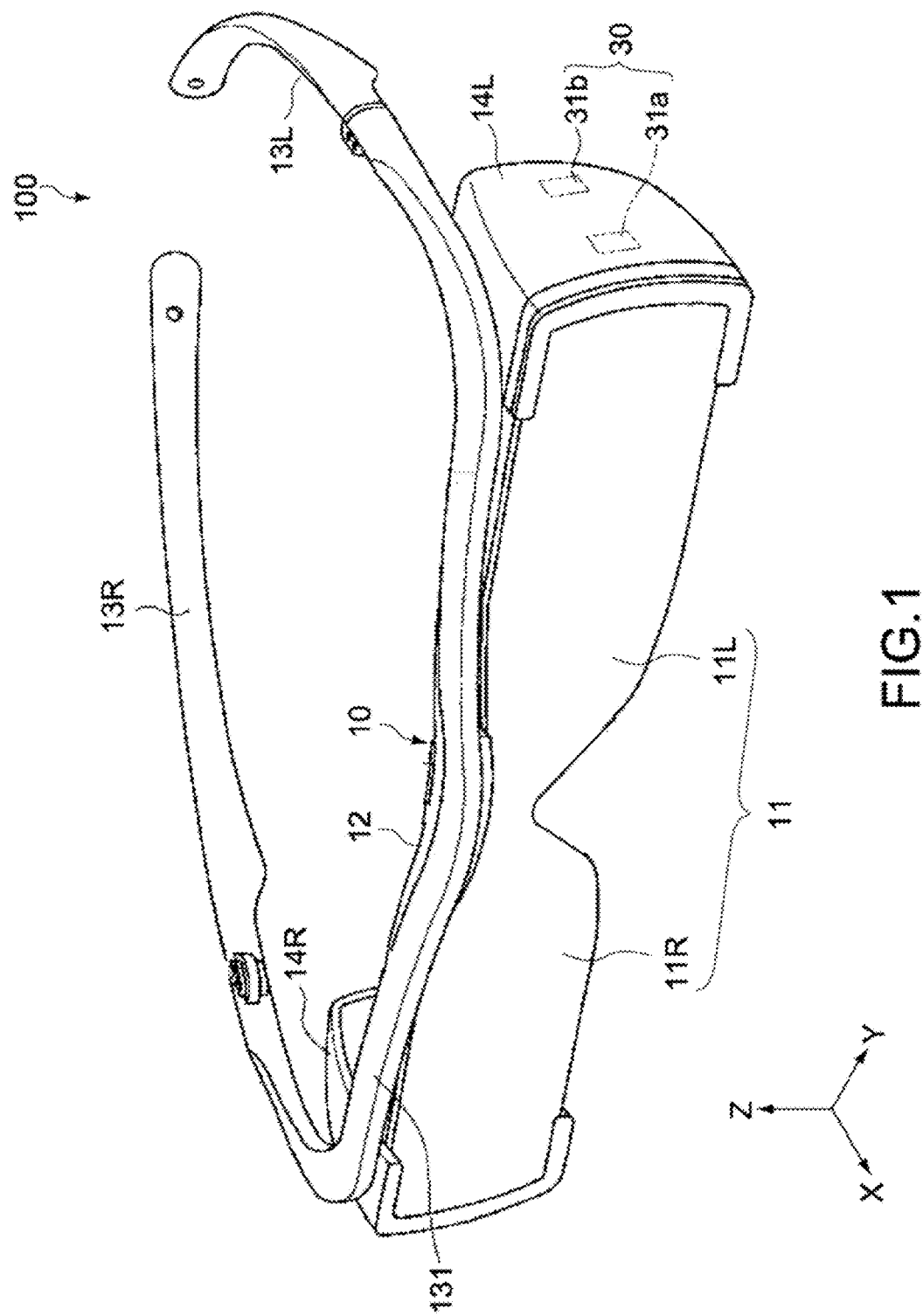
FIG. 1 is an overall perspective view of a display apparatus according to a first embodiment of the present technology.

FIG. 1 is a perspective view of a display apparatus according to an embodiment of the present technology when viewed from the front side. In each figure, X, Y, and Z axes are three axial directions orthogonal to one another, and the X axis represents a front and back direction, the Y axis represents a right and left direction, and the Z axis represents a height direction.

[Configuration of Display Apparatus]

A display apparatus 100 of this embodiment is configured as a head-mounted display that is mountable on the head of a user. The display apparatus 100 includes a light guide portion 11 and optical units 14R and 14L.

The light guide portion 11 includes display plates 11R and 11L that are disposed in front of the eyes of the user. The display plates 11R and 11L are supported by a frame portion 12. The display apparatus 100 further includes temple portions 13R and 13L. The temple portions 13R and 13L are attached to the frame portion 12 so as to be deformable. The temple portions 13R and 13L are configured to be mountable on the head of the user.

Figure 2:
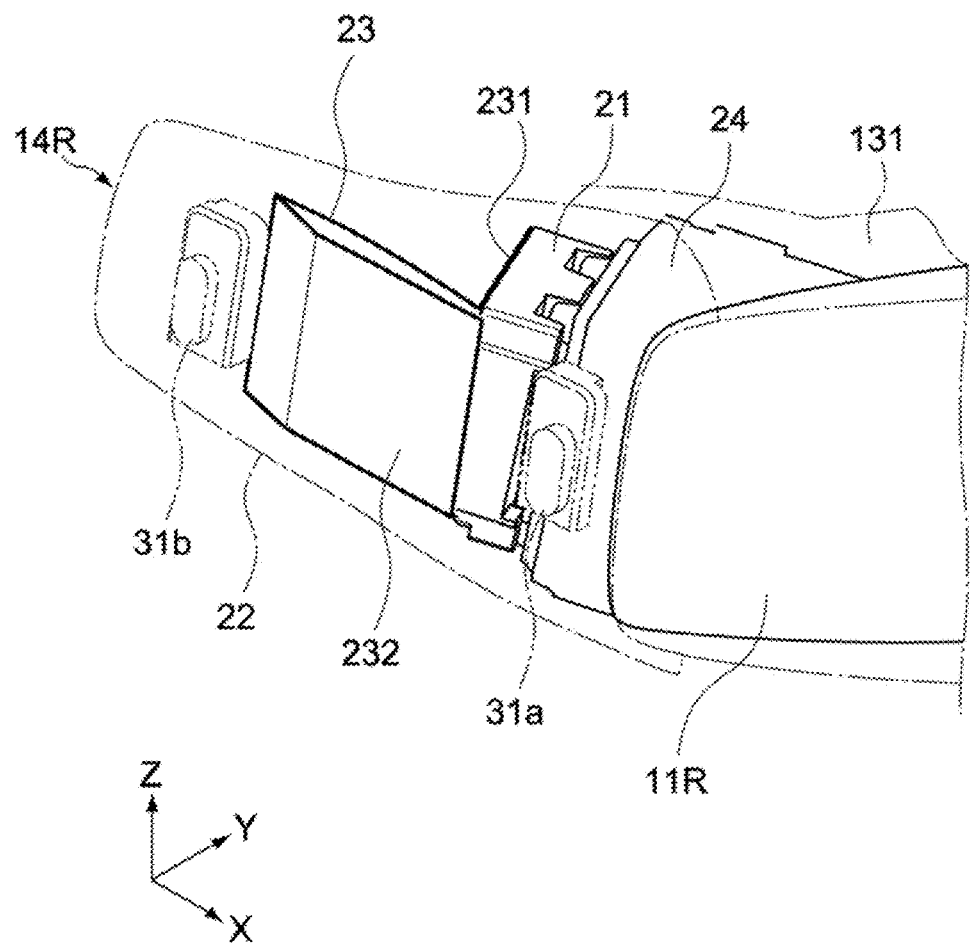
FIG. 2 is a perspective view schematically showing an internal configuration of an optical unit in the display apparatus.
Figure 3:
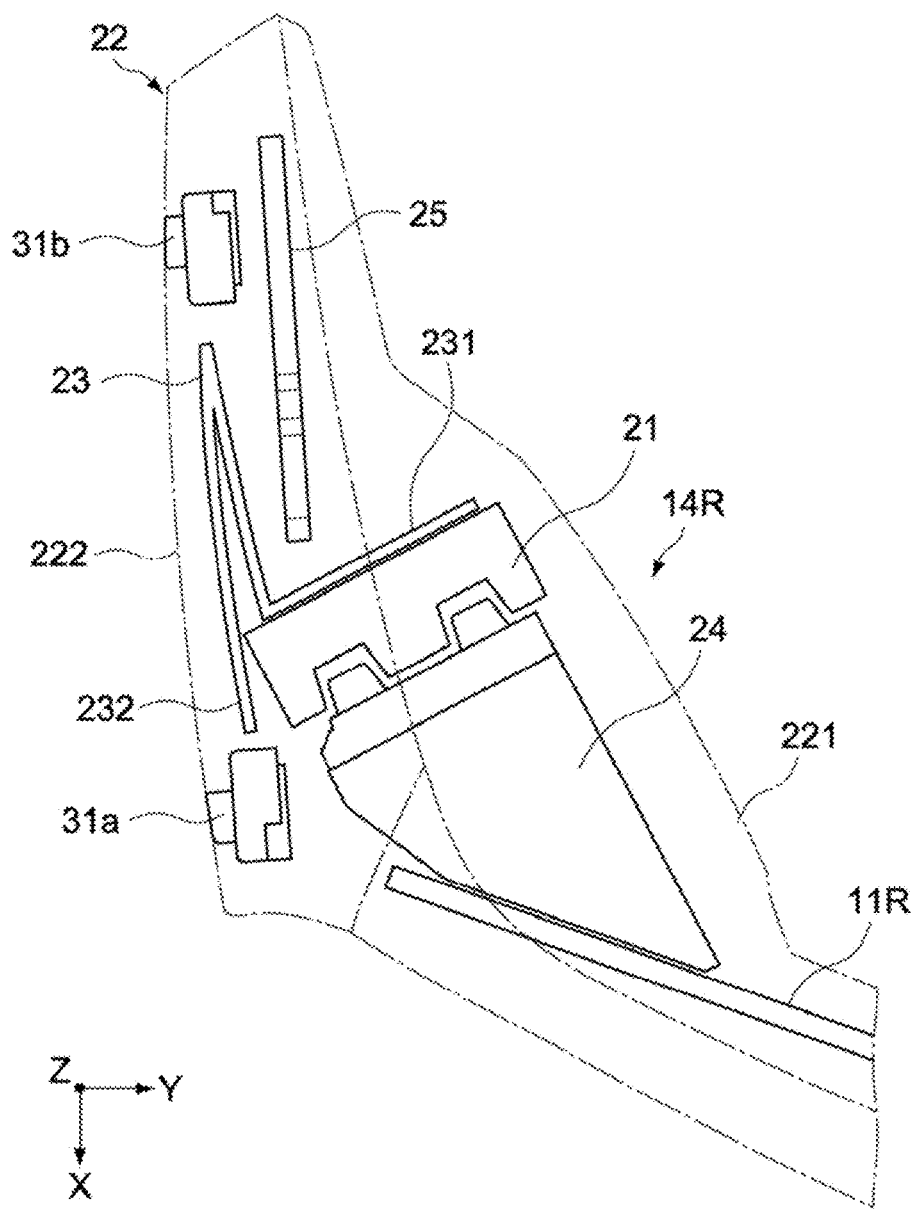
FIG. 3 is a schematic plan view showing an internal structure of the optical unit.

The optical units 14R and 14L each have a similar configuration and are symmetrically configured. FIG. 2 is a perspective view schematically showing the internal configuration of the optical unit 14R, and FIG. 3 is a schematic plan view thereof.

The optical unit 14R includes an image display portion 21, a casing 22, a heat-transfer member 23, and a collimator 24. The image display portion 21 is configured to be capable of displaying an image to be projected to the display plate 11R. The casing 22 houses the image display portion 21 and is fixed to the frame portion 12. The heat-transfer member 23 includes a first end 231 and a second end 232 and is configured to be deformable. The first end 231 is connected to the image display portion 21. The second end 232 is connected to an inner surface of the casing 22. The collimator 24 is housed in the casing 22 and is configured as a projection portion or a projection optical portion that projects a display image of the image display portion 21 to the display plate 11R.

Hereinafter, details of each portion will be described.

The display plates 11R and 11L are disposed in front of the eyes of the user and are configured to be capable of displaying images to be presented to the user. The display plate 11R displays a right-eye image, and the display plate 11L displays a left-eye image. In this embodiment, the display plates 11R and 11L are constituted by translucent light guide plates that are capable of outputting images to the right eye and the left eye of the user, respectively, the images being projected from the optical units 14R and 14L. The display plates 11R and 11L may be constituted by a common member or different members.

The frame portion 12 is a frame body including rims that support the respective display plates 11R and 11L and a bridge that couples those components. The frame portion 12 is constituted by a metal material such as a magnesium alloy or an aluminum alloy. The frame portion 12 is provided with a nose pad (not shown) including a pair of pad portions.

The temple portions 13R and 13L extend backward from the right edge and the left edge of the frame portion 12, respectively, and are formed into a shape mountable on both sides of the head and upper portions of both ears of the user. The temple portions 13R and 13L are constituted by a synthetic resin material that is moderately deformable with respect to the frame portion 12, or the like. The temple portions 13R and 13L are constituted such that external force does not act on the optical units 14R and 14L, when the temple portions 13R and 13L are deformed.

In this embodiment, the temple portions 13R and 13L are constituted by a single member by being coupled to each other via a coupling portion 131 fixed to the upper surface of the frame portion 12, but may not be limited thereto and may be constituted by different members.

The optical units 14R and 14L are fixed to a right-side edge portion and a left-side edge portion of the frame portion 12, respectively, and project a right-eye image and a left-eye image to the display plates 11R and 11L, respectively. As described above, since the optical units 14R and 14L are symmetrically configured, the optical unit 14R on one side will be described here.

As shown in FIGS. 2 and 3, in the display apparatus 100 according to this embodiment, the optical unit 14R includes the image display portion 21, the collimator 24, the heat-transfer member 23, a wiring substrate 25, and the casing 22 that houses those components.

The collimator 24 is fixed to an inner surface of the display plate 11R. The image display portion 21 is disposed to face an end of the collimator 24. The image display portion 21 is configured as a light source including a self-emitting element such as an LED (Light Emitting Diode) capable of projecting an image to the display plate 11R via the collimator 24, and corresponds to a typical heat source of the display apparatus 100. After the position is adjusted to the end of the collimator 24, the image display portion 21 is bonded to the end. The image display portion 21 is electrically connected to the wiring substrate 25 via a wiring member such as a bonding wire. The wiring substrate 25 is disposed inside the casing 22.

Figure 4:
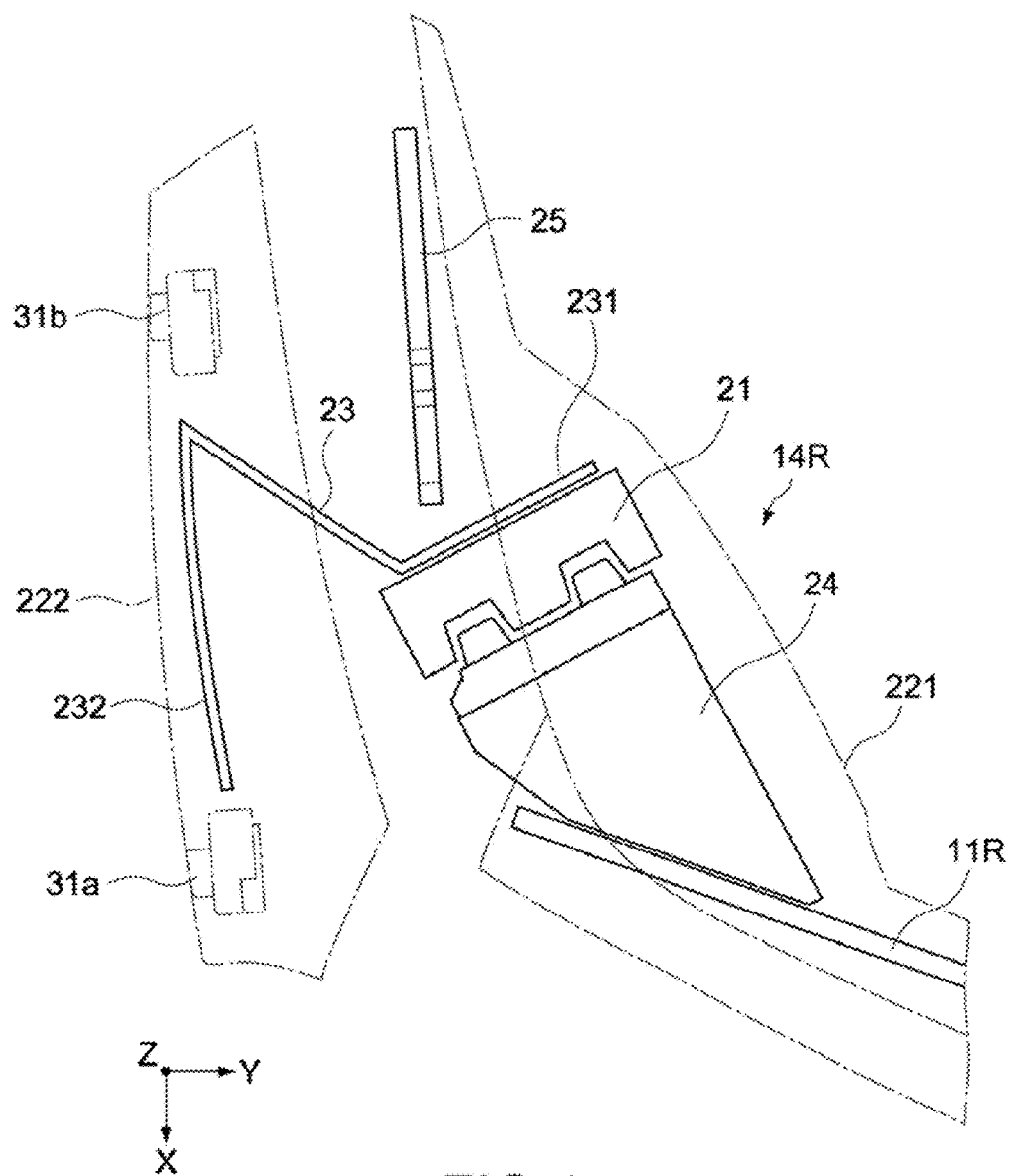
FIG. 4 is a schematic plan view showing a state where a second casing portion is separated in the optical unit.

The casing 22 includes a first casing portion 221 and a second casing portion 222. The first casing portion 221 constitutes an inner side surface of the casing 22 facing a user. The second casing portion 222 constitutes an outer side surface of the casing 22. The first casing portion 221 and the second casing portion 222 are configured to be mutually separable. FIG. 4 is a schematic plan view of the optical unit 14R, showing a state where the second casing portion 222 is separated from the first casing portion 221.

The first casing portion 221 supports the image display portion 21, the collimator 24, and the wiring substrate 25. The first casing portion 221 is integrally fixed to the frame portion 12. In this embodiment, the first casing portion 221 also has a function as a cover member that covers the inner surface side of the frame portion 12. The first casing portion 221 is constituted by an injection-molded body made of a plastic material, for example.

The second casing portion 222 is attached to the first casing portion 221 so as to cover the inside of the first casing portion 221. The second casing portion 222 is constituted by an injection-molded body made of a plastic material but may be constituted by a metal material such as an aluminum alloy. The second casing portion 222 is fixed to the first casing portion 221 via one or a plurality of screw members, for example.

The heat-transfer member 23 is constituted by a deformable sheet material having the first end 231 and the second end 232. The first end 231 is connected to the image display portion 21. The second end 232 is connected to the inner surface of the second casing portion 222. The first end 231 and the second end 232 are bonded to the image display portion 21 and the second casing portion 222, respectively, via a thermal conductive adhesive. As the thermal conductive adhesive, for example, one containing thermal conductive filler selected from alumina, aluminum nitride, silicon carbide, graphite, and the like is used.

The heat-transfer member 23 has a function of transferring heat, which is generated in the image display portion 21, to the casing 22 (second casing portion 222). Specifically, since the image display portion 21 has a relatively high heating value, in order to ensure a stable image display function, the image display portion 21 is configured to be capable of radiating heat to the casing 22. The first end 231 of the heat-transfer member 23 is attached to the back surface (non-light-emitting surface) of the image display portion 21.

A constituent material of the heat-transfer member 23 is not particularly limited and is constituted by a carbon-based material, a metal material, a thermal conductive synthetic resin material, or the like. Examples of the carbon-based material include graphite. Examples of the thermal conductive synthetic resin material include a thermal conductive acrylic sheet and a thermal conductive silicon sheet. In this embodiment, the heat-transfer member 23 is constituted by a sheet-like carbon-based material, for example, a graphite sheet.

The thickness and length of the heat-transfer member 23 are not particularly limited and can be appropriately set according to heat-transfer characteristics of the heat-transfer member 23, workability of assembly of the casing 22, and the like. In this embodiment, the length can be set to be extendable in accordance with a distance between the image display portion 21 and the second casing portion 222. In general, the thermal conductivity value of the graphite sheet is very high (for example, 1500 W/mK), and the heat can be transferred from the image display portion 21 to the second casing portion 222 without being largely influenced by the sheet length.

Figure 8:
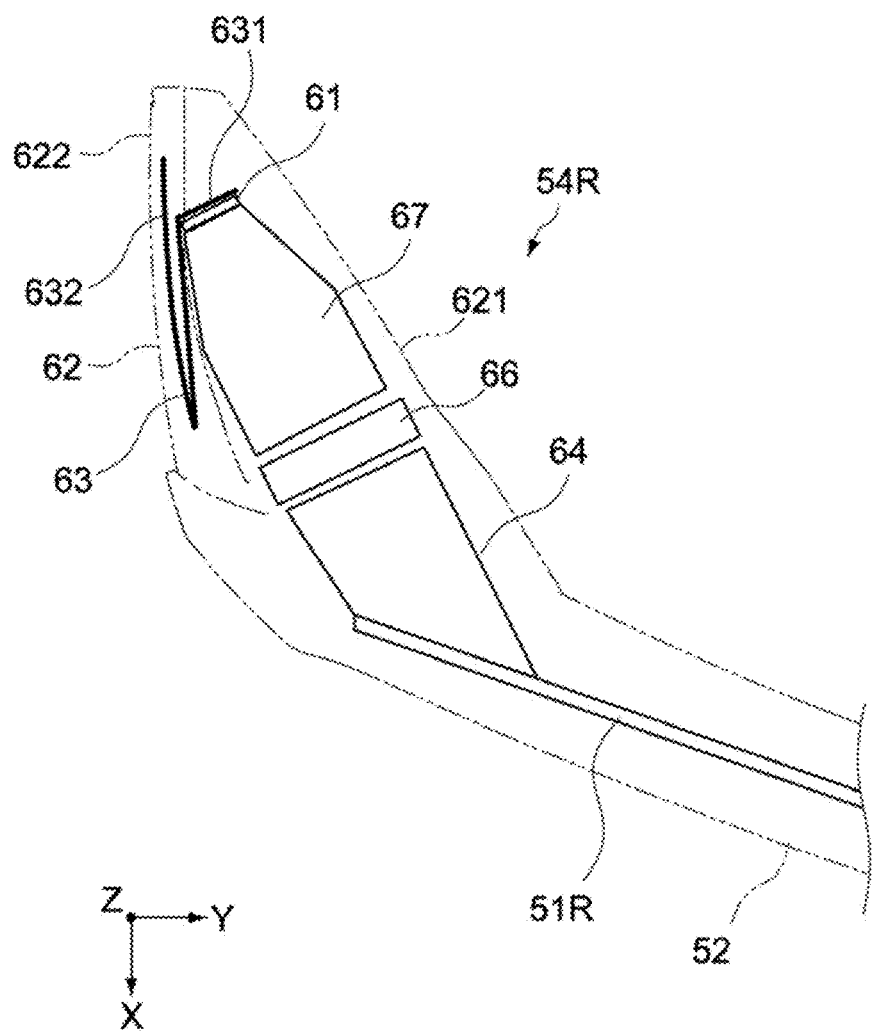
FIG. 8 is a schematic plan view showing an internal structure of the optical unit.

In this embodiment, a surface of the first end 231, which is brought into contact with the image display portion 21, and a surface of the second end 232, which is brought into contact with the second casing portion 222, are assumed to be different sheet surfaces of the heat-transfer member 23. However, both the surfaces may be the same sheet surface (FIG. 8). In general, the graphite sheet has a higher thermal conductivity value in an in-plane direction than in the thickness direction. Thus, when connection surfaces of the respective ends 231 and 232 are made to be the same sheet surface, it is possible to achieve further improvement in heat radiation efficiency of the image display portion 21.

The heat-transfer member 23 is housed in a state of being folded inside the casing 22. A folding method is not particularly limited. In this embodiment, the heat-transfer member 23 is disposed between the image display portion 21 and the second casing portion 222 so as to be folded a plurality of times about the height direction (Z-axis direction) of the display apparatus 100 and extendable and deformable along a right and left direction (Y-axis direction) of the display apparatus 100. This enables the heat-transfer member 23 to be easily deformable to a posture shown in FIG. 3 when the second casing portion 222 is attached to the first casing portion 221. Thus, such an attaching operation can be appropriately and easily performed.

The display apparatus 100 of this embodiment includes a detection portion 30 (FIG. 1) configured to be capable of detecting an input operation of a user. The detection portion 30 is provided to the optical unit 14R on one side, but may be provided to the optical unit 14L on the other side or both of the optical units 14R and 14L.

As shown in FIGS. 2 and 3, the detection portion 30 includes a pair of detection elements 31a and 31b. The pair of detection elements 31a and 31b are disposed on the second casing portion 222 so as to sandwich the second end 232 of the heat-transfer member 23 therebetween in a front and back direction (X-axis direction). This can detect an input operation of the user without impairing heat radiation effects of the image display portion 21.

The pair of detection elements 31a and 31b are configured by proximity sensors. The detection elements 31a and 31b are exposed to the outside via windows portions formed in the second casing portion 222. The detection elements 31a and 31b are electrically connected to the wiring substrate 25 via a wiring member such as a bonding wire.

The display apparatus 100 according to this embodiment is configured such that images to be displayed on the display plates 11R and 11L can be controlled on the basis of a user's input operation detected by the detection portion 30. As the control modes of images, scrolling, switching, and rescaling of images and the like are included. Such image control is executed in accordance with operation modes (gesture) by users. Determination on operation modes may be performed by a determination circuit mounted onto the wiring substrate 25 or may be performed by a control unit (not shown) that can communicate with the wiring substrate 25 in a wired or wireless manner.

[Operation of Display Apparatus]

Next, a typical operation of the display apparatus 100 according to this embodiment configured as described above will be described.

The display apparatus 100 is used in a state of being mounted on the head of a user. The display apparatus 100 presents images, which are projected from the paired optical units 14R and 14L to the display plates 11R and 11L, respectively, to the user. In this embodiment, the display plates 11R and 11L are constituted by translucent light guide plates, and thus the user can visually recognize a forward field of view and a display image at the same time.

The display image may be a 2D image or 3D image. Typically, the optical units 14R and 14L project image data to the display plates 11R and 11L, respectively. The image data is input from a control portion (not shown).

In the display apparatus 100 of this embodiment, the heat of the image display portion 21 can be efficiently radiated by the heat-transfer member 23 disposed between the image display portion 21 and the casing 22. This can inhibit thermal degradation of the image display portion 21 and prevent reduction in image quality of a display image.

Further, the heat-transfer member 23 is connected to the second casing portion 222, which constitutes the outer side surface of the casing 22, and thus the user does not perceive a temperature rise of the casing 22. Further, the second casing portion 222 is constituted by a different member from the first casing portion 221. Thus, thermal resistance from the second casing portion 222 to the first casing portion 221 can be increased, and the heat transfer from the second casing portion 222 to the first casing portion 221 can be suppressed.

Additionally, since a graphite sheet is used for the heat-transfer member 23, reduction in weight and downsizing of the optical units 14R and 14L can be achieved. This can contribute to reduction in weight and downsizing of the display apparatus 100.

Meanwhile, in this embodiment, since the heat-transfer member 23 is configured to be deformable, distortion by external force acting on the casing 22 can be absorbed by the heat-transfer member 23. Specifically, since the image display portion 21 is not rigidly fixed to the second casing portion 222, it is possible to prevent reduction in positional accuracy of the image display portion 21 and the like due to external force acting on the second casing portion 222.

Further, since the heat-transfer member 23 is configured to be deformable, it is possible to attach the second casing portion 222 to the first casing portion 221 in a state where the second end 232 is connected to the inner surface of the second casing portion 222, and it is also possible to easily adjust the position of the image display portion 21.

Additionally, in this embodiment, since the detection portion 30 that detects an input operation of a user is provided to the optical unit 14R, the optical unit 14R can be caused to function as an input device of the display apparatus 100.

Especially in this embodiment, since the detection elements 31a and 31b are constituted by the proximity sensors, an input operation of the user can be detected in a contactless manner with respect to the casing 22. This makes it possible to perform an input operation without applying external force to the casing 22. Thus, it is possible to inhibit stress to be applied to the image display portion 21 by stress applied when an input operation is made, and to prevent reduction in positional accuracy of the image display portion 21.

<Second Embodiment>

Figure 5:
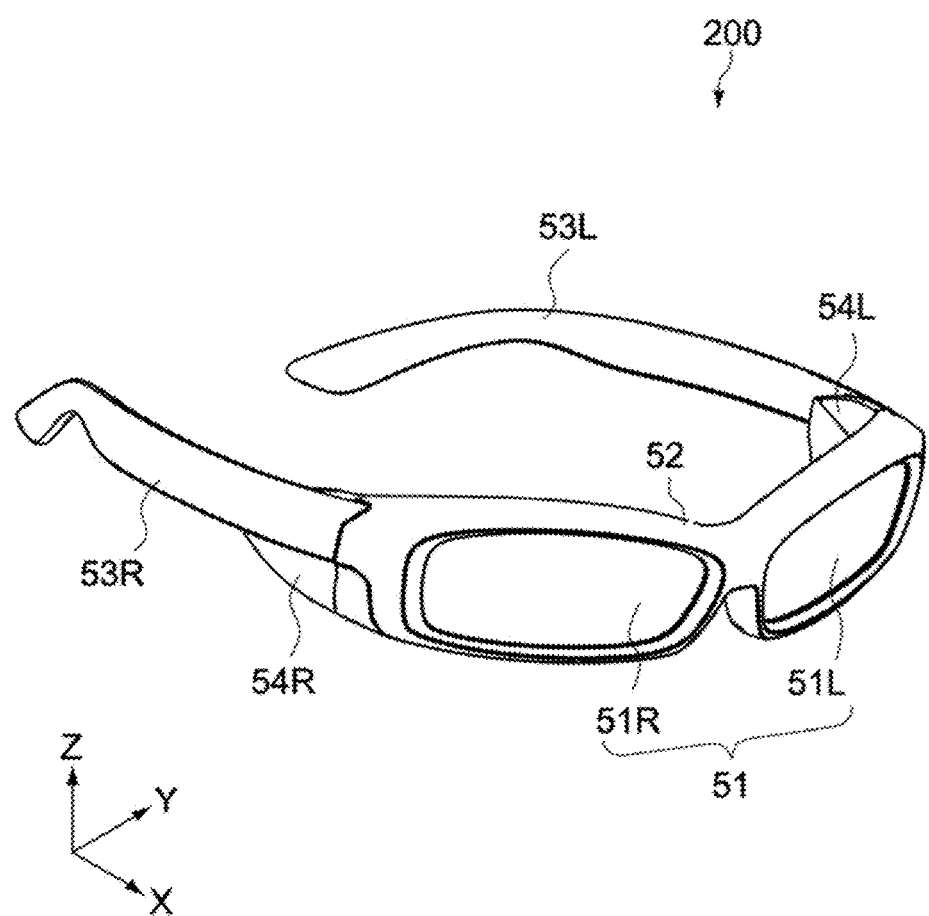
FIG. 5 is an overall perspective view of a display apparatus according to a second embodiment of the present technology.
Figure 6:
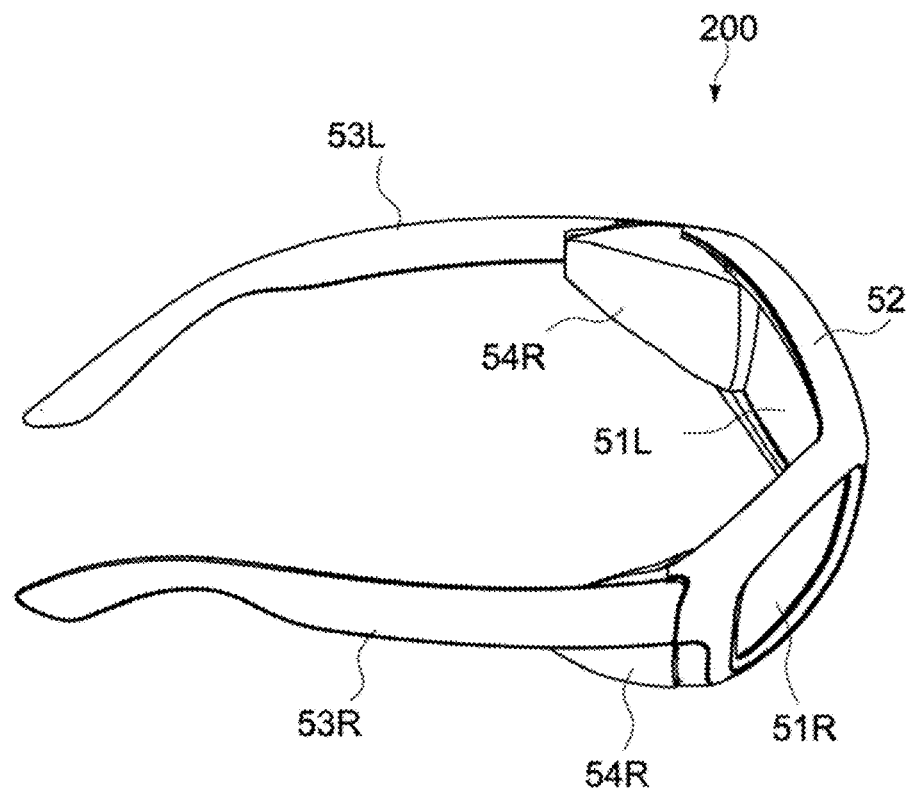
FIG. 6 is an overall perspective view when viewed from a side of the display apparatus.

FIGS. 5 and 6 each show the whole of a display apparatus 200 according to a second embodiment of the present technology. FIG. 5 is a perspective view when viewed from the front, and FIG. 6 is a perspective view when viewed from the side.

The display apparatus 200 of this embodiment is configured as a head-mounted display that is mountable on the head of a user. The display apparatus 200 includes a light guide portion 51 and optical units 54R and 54L.

The light guide portion 51 includes display plates 51R and 51L that are disposed in front of the eyes of the user. The display plates 51R and 51L are supported by a frame portion 52. The display apparatus 200 further includes temple portions 53R and 53L. The temple portions 53R and 53L are attached to both side portions of the frame portion 52 so as to be deformable. The temple portions 53R and 53L are configured to be mountable on the head of the user.

Figure 7:
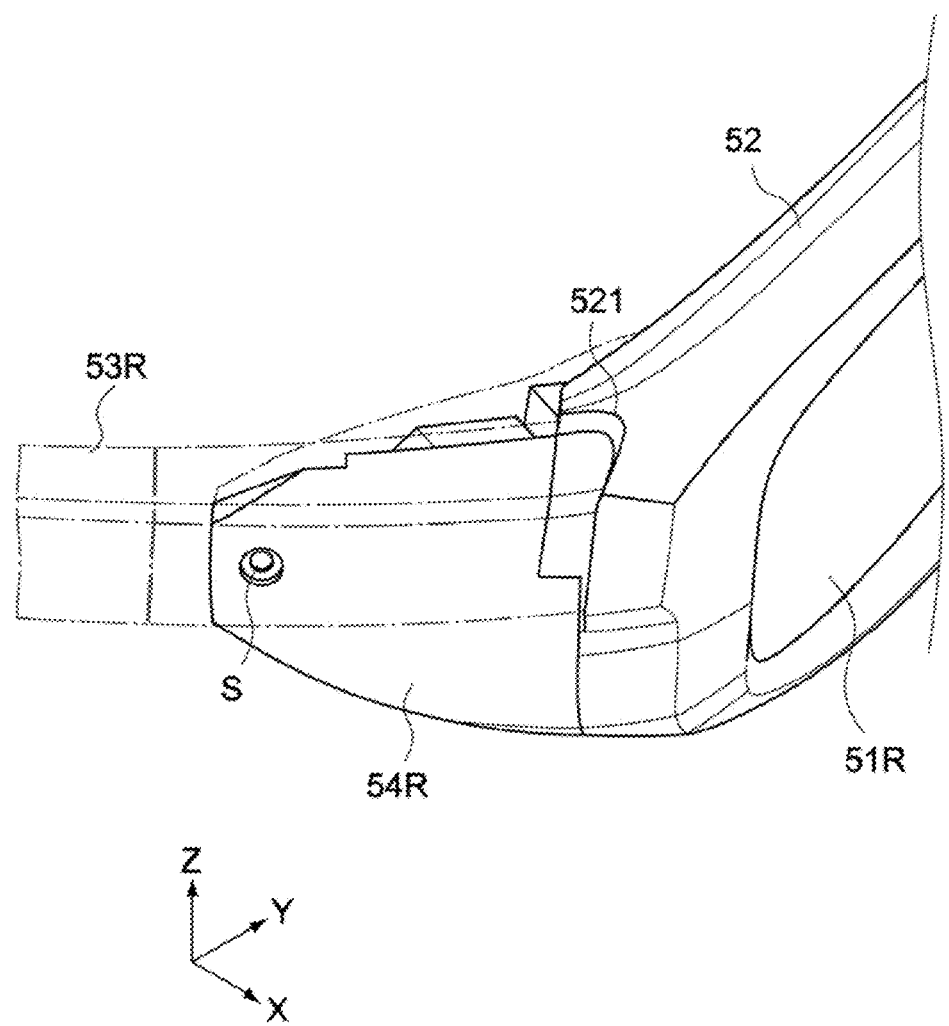
FIG. 7 is a perspective view schematically showing an optical unit in the display apparatus.

The optical units 54R and 54L each have a similar configuration and are symmetrically configured. FIG. 7 is a perspective view of a main part showing the optical unit 54R, and FIG. 8 is a schematic plan view showing the internal structure thereof.

The optical unit 54R includes a light source 61, a casing 62, a heat-transfer member 63, a collimator 64, and a liquid crystal panel 66. The light source 61 is constituted by an LED, for example, and functions as a backlight that illuminates the liquid crystal panel 66 from the back surface. The light source 61 corresponds to a typical heat source of the display apparatus 200. The casing 62 houses the light source 61, the heat-transfer member 63, the collimator 64, the liquid crystal panel 66, and the like and is fixed to the frame portion 52. The heat-transfer member 63 includes a first end 631 and a second end 632 and is configured to be deformable. The first end 631 is connected to the light source 61. The second end 632 is connected to an inner surface of the casing 62. The collimator 64 is configured as a projection optical portion that projects a display image of the liquid crystal panel 66 to the display plate 51R.

Hereinafter, details of each portion will be described.

The display plates 51R and 51L are disposed in front of the eyes of the user and are configured to be capable of displaying images to be presented to the user. The display plate 51R displays a right-eye image, and the display plate 51L displays a left-eye image. In this embodiment, the display plates 51R and 51L are constituted by translucent light guide plates that are capable of outputting images to the right eye and the left eye of the user, respectively, the images being projected from the optical units 54R and 54L.

The frame portion 52 is a frame body including rims that support the respective display plates 51R and 51L and a bridge that couples those components. The frame portion 52 is constituted by a metal material such as a magnesium alloy or an aluminum alloy. The frame portion 52 is provided with a nose pad, though not shown in the figure.

The temple portions 53R and 53L extend backward from the right edge and the left edge of the frame portion 52, respectively, and are formed into a shape mountable on both sides of the head and upper portions of both ears of the user. The temple portions 53R and 53L are disposed outside the optical units 54R and 54L in a contactless manner with the optical units 54R and 54L. The temple portions 53R and 53L are fixed to fixing parts 521 (FIG. 7) formed at both side edge portions of the frame portion 52.

The optical units 54R and 54L are fixed to a right-side edge portion and a left-side edge portion of the frame portion 52, respectively, and project a right-eye image and a left-eye image to the display plates 51R and 51L, respectively. As described above, since the optical units 54R and 54L are symmetrically configured, the optical unit 54R on one side will be described here.

As shown in FIG. 8, in the display apparatus 200 according to this embodiment, the optical unit 54R includes the light source 61, the collimator 64, the liquid crystal panel 66, a light pipe 67, the heat-transfer member 63, and the casing 22 that houses those components.

The collimator 64 is fixed to the inner surface of the display plate 51R. The liquid crystal panel 66 is disposed between the light source 61 and the collimator 64, and the light pipe 67 is disposed between the light source 61 and the liquid crystal panel 66. The liquid crystal panel 66 functions as an image modulation element and is constituted by a transmissive liquid crystal panel in this embodiment. After the position is adjusted to the end of the collimator 64, the liquid crystal panel 66 is disposed to face the end. The collimator 64 and the liquid crystal panel 66 function as a projection portion that projects an image to the light guide portion 11.

The light source 61 is an illumination light source that is disposed on the back surface of the liquid crystal panel 66 and is constituted by one or a plurality of LED elements. An emission color is not particularly limited, and an appropriate color for illumination light, such as white, blue, or green, can be adopted. The light pipe 67 is constituted by an optical element for guiding light output from the light source 61 to the back surface of the liquid crystal panel 66. The light source 61 and the light pipe 67 are fixed after the positions thereof are adjusted with respect to the light pipe 67 and the liquid crystal panel 66, respectively. The light source 61 and the liquid crystal panel 66 are electrically connected to a wiring substrate via a wiring member such as a bonding wire. The wiring substrate is disposed within the casing 62.

Figure 9:
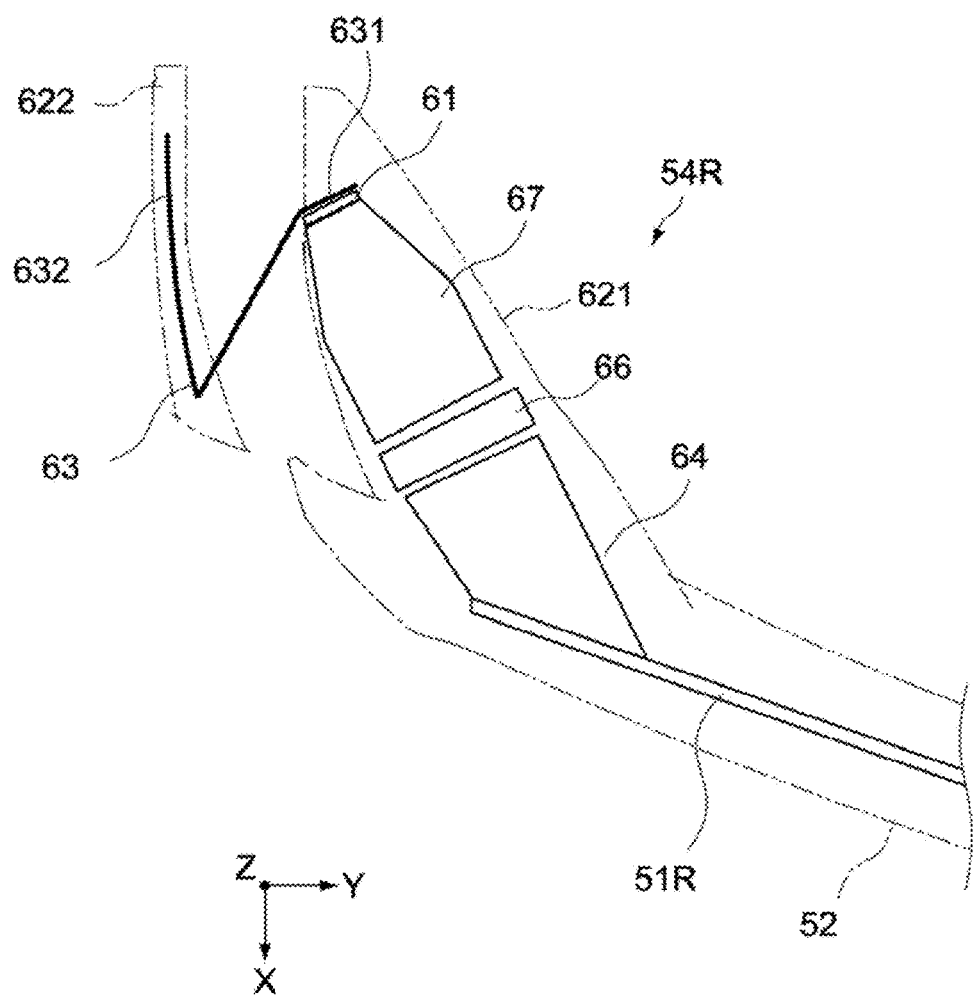
FIG. 9 is a schematic plan view showing a state where a second casing portion is separated in the optical unit.

The casing 62 includes a first casing portion 621 and a second casing portion 622. The first casing portion 621 constitutes an inner side surface of the casing 62 facing a user. The second casing portion 622 constitutes an outer side surface of the casing 62. The first casing portion 621 and the second casing portion 622 are configured to be mutually separable. FIG. 9 is a schematic plan view of the optical unit 54R, showing a state where the second casing portion 622 is separated from the first casing portion 621.

The first casing portion 621 supports the light source 61, the collimator 64, the liquid crystal panel 66, the light pipe 67, the wiring substrate (not shown), and the like. The first casing portion 621 is integrally fixed to the frame portion 52. In this embodiment, the first casing portion 621 also has a function as a cover member that covers the inner surface side of the frame portion 52. The first casing portion 621 is constituted by an injection-molded body made of a plastic material, for example.

The second casing portion 622 is attached to the first casing portion 621 so as to cover the inside of the first casing portion 621. The second casing portion 622 is constituted by an injection-molded body made of a plastic material but may be constituted by a metal material such as an aluminum alloy. The second casing portion 622 is fixed to the first casing portion 621 via a screw member S (FIG. 7), for example.

The heat-transfer member 63 is constituted by a deformable sheet material having the first end 631 and the second end 632. The first end 631 is connected to the light source 61. The second end 632 is connected to the inner surface of the second casing portion 622. The first end 631 and the second end 632 are bonded to the light source 61 and the second casing portion 622, respectively, via a thermal conductive adhesive. As the thermal conductive adhesive, for example, one containing thermal conductive filler selected from alumina, aluminum nitride, silicon carbide, graphite, and the like is used.

The heat-transfer member 63 has a function of transferring heat, which is generated in the light source 61, to the casing 62 (second casing portion 622). Specifically, since the light source 61 has a relatively high heating value, in order to ensure a stable image display function, the light source 61 is configured to be capable of radiating heat to the casing 62.

The first end 631 of the heat-transfer member 63 is attached to the back surface (non-light-emitting surface) of the light source 61.

A constituent material of the heat-transfer member 63 is not particularly limited and is constituted by a carbon-based material, a metal material, a thermal conductive synthetic resin material, or the like. Examples of the carbon-based material include graphite. Examples of the thermal conductive synthetic resin material include a thermal conductive acrylic sheet and a thermal conductive silicon sheet. In this embodiment, the heat-transfer member 63 is constituted by a sheet-like carbon-based material, for example, a graphite sheet.

The thickness and length of the heat-transfer member 63 are not particularly limited and can be appropriately set according to heat-transfer characteristics of the heat-transfer member 63, workability of assembly of the casing 62, and the like. In this embodiment, the length can be set to be extendable in accordance with a distance between the light source 61 and the second casing portion 622. In general, the thermal conductivity value of the graphite sheet is very high (for example, 1500 W/mK), and the heat can be transferred from the light source 61 to the second casing portion 622 without being largely influenced by the sheet length.

In this embodiment, a surface of the first end 631, which is brought into contact with the light source 61, and a surface of the second end 632, which is brought into contact with the second casing portion 622, are assumed to be the same sheet surface of the heat-transfer member 63. In general, the graphite sheet has a higher thermal conductivity value in an in-plane direction than in the thickness direction. Thus, when connection surfaces of the respective ends 631 and 632 are made to be the same sheet surface, it is possible to achieve further improvement in heat radiation efficiency of the light source 61.

The heat-transfer member 63 is housed in a state of being folded inside the casing 62. A folding method is not particularly limited. In this embodiment, the heat-transfer member 63 is disposed between the light source 61 and the second casing portion 622 so as to be folded a plurality of times about the height direction (Z-axis direction) of the display apparatus 200 and extendable and deformable along a right and left direction (Y-axis direction) of the display apparatus 200. This enables the heat-transfer member 63 to be easily deformable to a posture shown in FIG. 8 when the second casing portion 622 is attached to the first casing portion 621. Thus, such an attaching operation can be appropriately and easily performed.

Also in the display apparatus 200 of this embodiment configured as described above, effects and actions similar to those of the first embodiment described above can be obtained.

Specifically, according to this embodiment, the heat-transfer member 63 disposed between the light source 61 and the casing 62 enables the heat of the light source 61 to be radiated efficiently, and distortion by external force acting on the casing 62 can be absorbed by the heat-transfer member 63. This can ensure positional accuracy of the light source 61 and the like.

<Third Embodiment>

Figure 10:
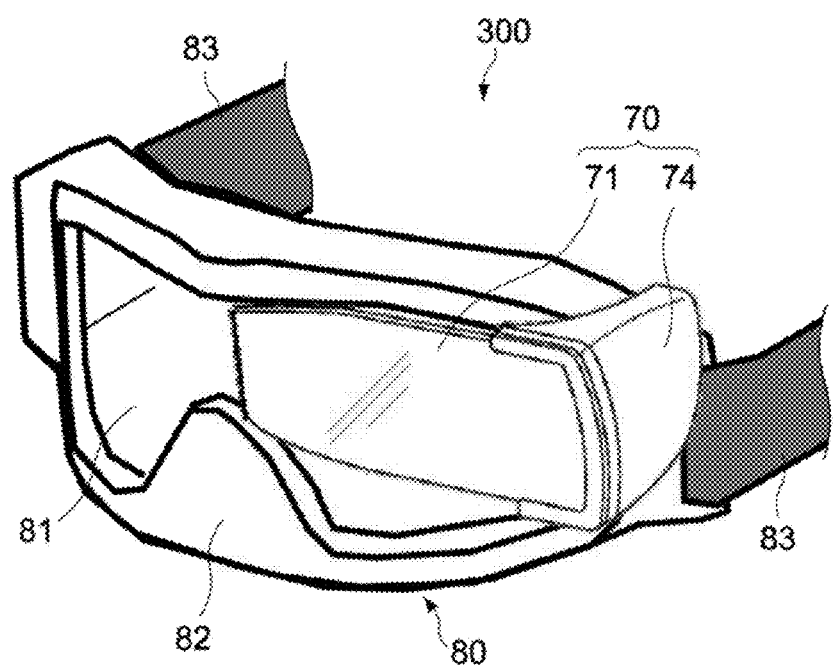
FIG. 10 is an overall perspective view of a display apparatus according to a third embodiment of the present technology.
Figure 11:
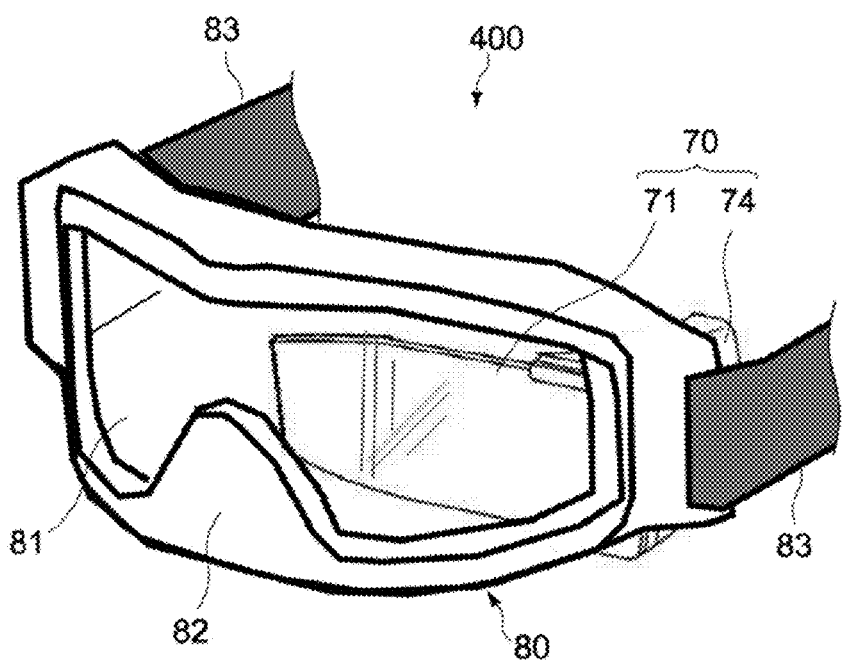
FIG. 11 is an overall perspective view showing a modified example of a configuration of the display apparatus.

FIGS. 10 and 11 are each a perspective view showing a display apparatus according to a third embodiment of the present technology.

A display apparatus 300 of this embodiment includes a mounting fixture 80 like goggles or a helmet, and a display unit 70. The display unit 70 is provided to the outside of the mounting fixture 80 so as to be capable of displaying a predetermined image of one eye (left eye in the shown example) of a user wearing the mounting fixture 80.

The mounting fixture 80 includes a transparent cover 81, a support 82 that supports the cover 81, and a band 83 that is stretched between both side portions of the support 82.

The display unit 70 includes a light guide portion 71 and an optical unit 74. The light guide portion 71 is constituted by a transparent light guide plate and is disposed at a position facing the left eye of the user via the cover 81 of the mounting fixture 80. The optical unit 74 is fixed to one end of the light guide portion 71 and is configured to be capable of projecting an image to the light guide portion 71, the image being presented to the left eye of the user.

The display unit 70 may be configured to be attachable to and detachable from the mounting fixture 80. Specifically, the mounting fixture 80 may not be constituted as exclusive goods for the display apparatus 300, but may be a general-purpose article on the market.

The optical unit 74 has a similar configuration to the optical units 14L and 14R or the optical units 54L and 54R (FIGS. 3 and 8) described in the first and second embodiments. The optical unit 74 includes various constituent members and a casing that houses those constituent members. The various constituent members include an image display portion or light source, a collimator (projection optical portion), an image modulation element, a heat-transfer member, and the like. The members and the casing have similar configurations to those of the first and second embodiments described above, and thus description thereof will be omitted.

In the display apparatus 300 shown in FIG. 10, the display unit 70 is provided to the outside of the support 82 (mounting fixture 80). Instead of this, the display unit 70 may be provided to the inside of the support 82 (mounting fixture 80), like a display apparatus 400 shown in FIG. 11.

Also in the display apparatuses 300 and 400 of this embodiment configured as described above, actions and effects similar to those of the first and second embodiments described above will be obtained. It should be noted that the display unit 70 is not limited to the configuration example for the left eye, and may be configured for a right eye or for both eyes.

Hereinabove, the embodiments of the present technology have been described, but the present technology is not limited to the embodiments described above and can be variously modified without departing from the gist of the present technology as a matter of course.

For example, in the embodiments described above, the sheet material is used for the heat-transfer members 23 and 63, but instead of this, members in the form of wire, wool, block, or any other appropriate form may be adopted. Further, the heat-transfer members 23 and 63 are configured to be deformable in a predetermined direction by being provided with a folded structure, but the folding method is not limited to the above example. Further, the heat-transfer member may be constituted by an elastically deformable material.

Further, the display apparatus 200 according to the second embodiment described above may be provided with a detection portion capable of detecting an input operation of a user, as in the first embodiment. In this case as well, the detection portion can be provided to at least any one of the optical units 54R and 54L. Also in the display apparatuses 300 and 400 according to the third embodiment, the detection portion may be provided to the optical unit 74.

Additionally, the detection portion is not limited to the example of being constituted by one or a plurality of proximity switches. For example, the detection portion may be constituted by a contact sensor such as an electrostatic sensor, or may be a mechanical input device including an operation button and the like.

Additionally, in the embodiments described above, as the heat source of the optical unit, the image display portion 21, the light source 61, and the like have been described as examples, but the heat source is not limited thereto. The heat source may be a semiconductor component such as an IC or a CPU, a power circuit component, a battery, and other heat-generating elements. The present technology may be applied as a heat radiation mechanism for those heat-generating elements.

Additionally, in the embodiments described above, as the display apparatus, a glasses-type head-mounted display and a goggles-type display apparatus have been described as examples, but the present technology can also be applied to display apparatuses having other forms.

It should be noted that the present technology can have the following configurations.

(1) A display apparatus, including:
a light guide portion that is disposed in front of eyes of a user;
a casing that is fixed to the light guide portion;
a projection portion that is housed in the casing and is capable of projecting an image to the light guide portion;
a heat source that is disposed within the casing; and
a deformable heat-transfer member that includes a first end and a second end, the first end being connected to the heat source, the second end being connected to an inner surface of the casing.

(2) The display apparatus according to (1), in which
the casing includes
a first casing portion that supports the heat source, and
a second casing portion that is attached to the first casing portion and connected to the second end.

(3) The display apparatus according to (2), in which
the first casing portion constitutes an inner side surface of the casing facing the user, and
the second casing portion constitutes an outer side surface of the casing.

(4) The display apparatus according to any one of (1) to (3), in which
the heat-transfer member is constituted by a sheet-like carbon-based material.

(5) The display apparatus according to (4), in which
the heat-transfer member is housed in the casing in a folded state.

(6) The display apparatus according to any one of (1) to (5), further including a detection portion that is provided to the casing and is capable of detecting an input operation of the user.

(7) The display apparatus according to (6), in which
the detection portion includes a pair of detection elements that are disposed to sandwich the second end.

(8) The display apparatus according to (7), in which
the pair of detection elements are constituted by proximity sensors.

(9) The display apparatus according to any one of (1) to (8), in which
the heat source is a light source.

(10) The display apparatus according to (9), in which
the projection portion includes a projection optical portion and an image modulation element disposed between the light source and the projection optical portion.

(11) The display apparatus according to any one of (1) to (8), in which the heat source is an image display portion including a self-emitting element, and the projection portion includes a projection optical portion that projects a display image of the image display portion to the light guide portion.

DESCRIPTION OF SYMBOLS 11, 51, 71 light guide portion
12, 52 frame portion
13R, 13L, 53R, 54L temple portion
14R, 14L, 54R, 54L, 74 optical unit
21 image display portion
22, 62 casing
23, 63 heat-transfer member
24, 64 collimator
30 detection portion
31a, 31b detection element
61 light source
66 liquid crystal panel
70 display unit
100, 200, 300, 400 display apparatus
221, 621 first casing portion
222, 622 second casing portion
231, 631 first end
232, 632 second end

The invention claimed is:

1. A display apparatus, comprising:
a light guide portion that is disposed in front of eyes of a user;
a casing that includes a first casing portion and a second casing portion attached to the first casing portion and is fixed to the light guide portion;
a projection portion that is housed in the casing and is capable of projecting an image to the light guide portion;
a heat source that is disposed within the casing and is supported by the first casing portion; and
a deformable heat-transfer member that includes a first end and a second end, the first end being connected to the heat source, the second end being connected to an inner surface of the second casing portion.

2. The display apparatus according to claim 1, wherein the first casing portion constitutes an inner side surface of the casing facing the user, and
the second casing portion constitutes an outer side surface of the casing.

3. The display apparatus according to claim 1, wherein the heat-transfer member is constituted by a sheet-like carbon-based material.

4. The display apparatus according to claim 3, wherein the heat-transfer member is housed in the casing in a folded state.

5. The display apparatus according to claim 1, further comprising a detection portion that is provided to the casing and is capable of detecting an input operation of the user.

6. The display apparatus according to claim 5, wherein the detection portion includes a pair of detection elements that are disposed to sandwich the second end.

7. The display apparatus according to claim 6, wherein the pair of detection elements are constituted by proximity sensors.

8. The display apparatus according to claim 1, wherein the heat source is a light source.

9. The display apparatus according to claim 8, wherein the projection portion includes a projection optical portion and an image modulation element disposed between the light source and the projection optical portion.

10. The display apparatus according to claim 1, wherein the heat source is an image display portion including a self-emitting element, and
the projection portion includes a projection optical portion that projects a display image of the image display portion to the light guide portion.

* * * * *